United States Patent [19]

Vuckovich et al.

[11] Patent Number: 4,487,741
[45] Date of Patent: Dec. 11, 1984

[54] TRANSFER OF FUEL ASSEMBLIES

[75] Inventors: Michael Vuckovich, Elizabeth Township, Allegheny County; John P. Burkett, South Huntingdon; Joseph Sallustio, Brentwood, all of Pa.

[73] Assignee: Westinghouse Electric Corp., Pittsburgh, Pa.

[21] Appl. No.: 325,881

[22] Filed: Nov. 30, 1981

[51] Int. Cl.³ .............................................. G21C 19/10
[52] U.S. Cl. ..................... 376/271; 376/245; 376/277; 212/149; 294/86 A; 364/153; 340/685
[58] Field of Search ............... 376/264, 265, 268, 269, 376/270, 271, 245, 277; 212/149, 150, 151, 153, 154, 155, 86; 294/86 A, 82 R, 110 R; 364/463, 153; 340/685

[56] References Cited

U.S. PATENT DOCUMENTS

| | | | |
|---|---|---|---|
| 3,740,741 | 6/1973 | Jones | 340/685 X |
| 3,854,593 | 12/1974 | Gross | 340/685 X |
| 3,913,081 | 10/1975 | Hamilton | 340/685 X |
| 4,081,086 | 3/1978 | Shallenberger et al. | 376/264 X |
| 4,212,006 | 7/1980 | Cakebread et al. | 340/685 |

FOREIGN PATENT DOCUMENTS

| | | | |
|---|---|---|---|
| 2220994 | 11/1973 | Fed. Rep. of Germany | 212/149 |
| 977215 | 12/1964 | United Kingdom . | |
| 1042557 | 9/1966 | United Kingdom . | |
| 1353349 | 5/1974 | United Kingdom . | |
| 1544546 | 4/1979 | United Kingdom . | |
| 0713816 | 2/1980 | U.S.S.R. | 212/149 |
| 0775044 | 11/1980 | U.S.S.R. | 212/150 |

OTHER PUBLICATIONS

*Nuclear Engineering International*, Jul. 1981, pp. 42-44, "Refuelling", B. Fontaine and P. Ribaux.

*Primary Examiner*—Richard E. Schafer
*Assistant Examiner*—Daniel Wasil
*Attorney, Agent, or Firm*—Daniel C. Abelee

[57] ABSTRACT

Fuel assemblies of a nuclear reactor are transferred during fueling or refueling or the like by a crane. The work-engaging fixture of the crane picks up an assembly, removes it from this slot, transfers it to the deposit site and deposits it in its slot at the deposit site. The control for the crane includes a strain gauge connected to the crane line which raises and lowers the load. The strain gauge senses the load on the crane. The signal from the strain gauge is compared with setpoints; a high-level setpoint, a low-level setpoint and a slack-line setpoint. If the strain gauge signal exceeds the high-level setpoint, the line drive is disabled. This event may occur during raising of a fuel assembly which encounters resistance. The high-level setpoint may be overridden under proper precautions. The line drive is also disabled if the strain gauge signal is less than the low-level setpoint. This event occurs when a fuel assembly being deposited contacts the bottom of its slot or an obstruction in, or at the entry to the slot. To preclude lateral movement and possible damage to a fuel assembly suspended from the crane line, the traverse drive of the crane is disabled once the strain-gauge exceeds the low-level setpoint. The traverse drive can only be enabled after the strain-gauge signal is less than the slack-line set-point. This occurs when the line has been set in slack-line setting. When the line is tensioned after slack-line setting, the traverse drive remains enabled only if the line has been disconnected from the fuel assembly.

6 Claims, 8 Drawing Figures

TRANSFER OF FUEL ASSEMBLIES

BACKGROUND OF THE INVENTION

This invention relates to the art of nuclear reactor power plants and has particular relationship to the transfer of fuel assemblies to and from nuclear reactors during fueling, refueling and the like. While this invention is uniquely applicable to nuclear reactors, it is realized that the invention may have applicability in other arts. To the extent this invention is applied in other arts, such application is regarded as within the scope of equivalents of this invention. It is also understood that while this invention is predominantly practiced to transfer fuel assemblies, it may also be applied to the transfer of individual fuel rods. Such application is within the scope of equivalents of this invention.

During refueling the core of a nuclear reactor with its fuel assemblies is immersed in highly radioactive water in the pressure vessel. The spent fuel assemblies which are to be removed are also highly radioactive. These fuel assemblies are positioned in slots in the core. Typically the spent fuel assemblies are removed to a vehicle which carries them to a pit where they are stored under water as nuclear waste. The replacement fuel assemblies are removed from a vehicle and transferred to the reactor where they are inserted in the slots vacated by the spent fuel assemblies.

The transfer of fuel assemblies between the vehicles and the reactor and the insertion of replacement fuel assemblies in the slots in the core is accomplished by a crane. The crane carries a line which terminates in a fixture for engaging the fuel assemblies. Typically the fixture has fingers which are expansible and collapsible under hydraulic pressure. Each fuel assembly has a hole in its top. The crane has a traverse drive which positions the fixture with the fingers collapsed over a fuel assembly. The line drive then guides the fixture into the hole in the assembly. The fingers are expanded to grip the fuel assembly. Then the line drive is energized to raise and remove the fuel assembly. Other facilities for engaging the fuel assemblies are also feasible. For example, each assembly may be provided in its top with an eyelet to be engaged by a hook terminating the crane line.

In carrying out the transfer of the fuel assemblies, it is necessary that the crane line be guided precisely into the hole in the fixture. It is necessary that the operator know if the fixture has encountered an obstruction at the boundaries of the slot which contains a fuel assembly. Positive intelligence must be available that a spent fuel assembly has been effectively engaged by the crane fixture. If a fuel assembly breaks during removal, a part of the broken radioactive assembly may lodge in the reactor under the water. This event constitutes a major catastrophy as it may disable a reactor altogether. The breaking of an assembly during removal must be avoided. While inserting an assembly in a slot, intelligence that the assembly has encountered an obstruction or the boundary of a slot is essential. It must also be known that the assembly is seated in the slot. There must also be intelligence that a fuel assembly being inserted or removed from a slot has encountered excessive resistance or that the movement of the assembly in or out is obstructed. Such increased resistance, particularly when a fuel assembly is being removed from a slot, may damage the crane by overloading the line drive or may rupture the line. At times it may be necessary to traverse the crane line laterally without raising the line to its uppermost starting position. It is indispensible that such a traverse be carried out with the crane-line and its fixture free of a fuel assembly. Provisions to assure that traverse of the line with a fuel assembly on the fixture is precluded are indispensible.

It is an object of this invention to provide apparatus uniquely suitable for the transfer of fuel assemblies to and from a nuclear reactor in whose use and operation the above-described condition shall be fully met.

SUMMARY OF THE INVENTION

In accordance with this invention, there is provided apparatus including a crane and a hoist-load monitor responsive to the loads on the crane throughout its operations in the transfer of a fuel assembly. There is also provided a control interfaced between the monitor and the crane, responsive to the monitor, for controlling the crane. The apparatus includes a load sensor, typically a strain gauge, which supplies intelligence as to the loading of the crane. The intelligence provided by the load sensor includes a measure of the loading when a fuel assembly is being raised, a measure of the loading when the assembly is being lowered and a measure indicating that crane line is slack; i.e., carries loading less than the weight of the line and fixture alone. The monitor includes setpoint means for setting desired levels of loading. The setpoints include a high-level (HL) setpoint, a low-level (LL) setpoint, and a slack-line (SL) setpoint. Appropriate indicators and signals for indicating the status of the loading with respect to the setpoints are provided. The HL setpoint is predominantly significant during raising of a fuel assembly. When the load sensor indicates that this setpoint is exceeded, the crane line drive is deenergized. The LL setpoint is predominantly significant during lowering of a fuel assembly. Measure by the load sensor of loading less than the LL setpoint indicates that the fuel assembly being lowered has contacted an obstruction, either by engagement with boundaries of a fuel assembly slot or because the fuel assembly has been seated in the slot. The operator can determine which of these events has occurred from the length of line taken up in the lowering and also by observation of the water in the reactor. The LL setpoint serves another purpose. Once the LL setpoint is exceeded during lowering the traverse drive is deenergized and is locked in the deenergized condition so that there can be no traverse even if the loading decreases to a magnitude between the LL setpoint and the SL setpoint. To unlock the traverse drive, it is necessary that the measure of the load sensor be less than the SL setpoint, i.e. less than the loading of line and fixture alone. This indicates that the crane line is slack. With the crane line slack, the fixture is disconnected from a fuel assembly. The crane line is subsequently raised to a position where the SL setpoint is exceeded. If the disconnection is effective, the loading is less than the LL setpoint and the crane line can be traversed laterally. If the disconnection is not effective, the LL setpoint is exceeded and the traverse drive is locked precluding traverse by the crane line and the fuel assembly which it carries.

The setpoints may be changed. However the mechanisms for changing the setpoints are in a locked cabinet for which only the supervisors have the key. The HL setpoint may be overridden. This purpose is accomplished by a key switch. Only the supervisors have the key. The key cannot be removed from the key slot unless it is turned to the non-overriding setting.

The setpoints are digital and their indications are digital. The measures of the load sensor are converted into digital magnitudes. The digital magnitudes avail a measure of the loading in pounds or kilograms.

BRIEF DESCRIPTION OF THE DRAWINGS

For a better understanding of this invention, both as to its organization and as to its method of operation, together with additional objects and advantages thereof, reference is made to the following description, taken in connection with the accompanying drawings, in which.

DETAILED DESCRIPTION OF EMBODIMENTS

Figure 1:
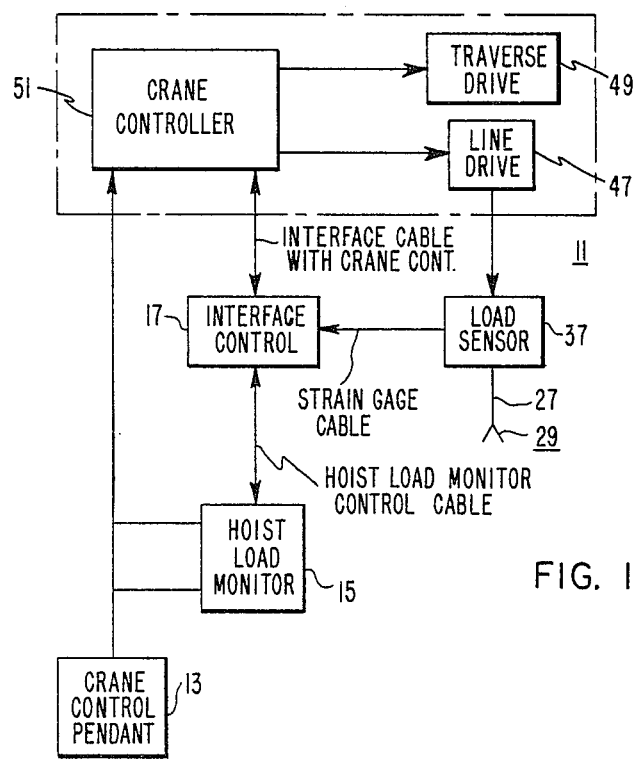
FIG. 1 is a block diagram showing generally apparatus in accordance with this invention.

The apparatus shown in the drawings includes a crane 11, a crane control pendant 13, a hoist-load monitor 15 and an interface control 17 interfaced between the monitor 15 and the controller 13. The hoist-load monitor 15 and the interface control 17 are shown as separate units in seperate containers. In the customary practice of this invention, these components actually are separate units in separate boxes. However, these components may be integrated with the crane 11 or may be combined physically. The significance to this invention of these components resides in their electrical cooperation with the crane and not in their physical structures.

Figure 2:
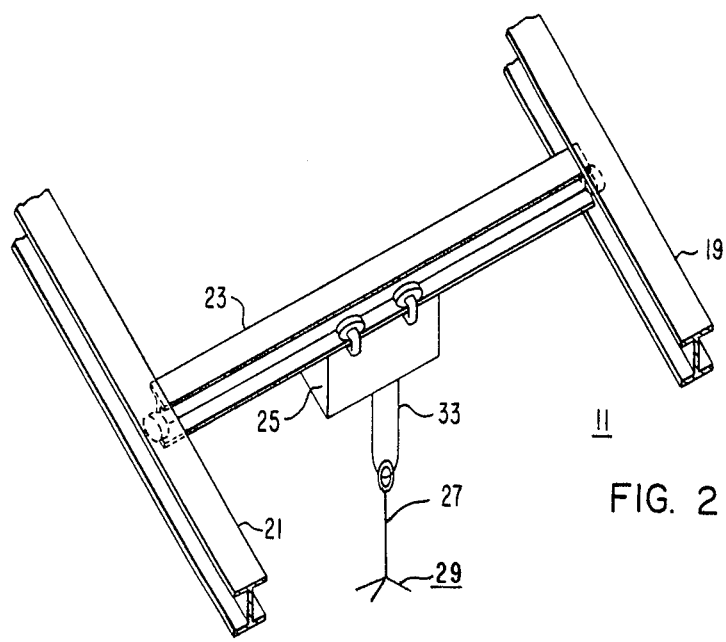
FIG. 2 is a diagrammatic fragmental view in perspective, showing the significant features of a crane into which apparatus in accordance with this invention is integrated.
Figure 3:
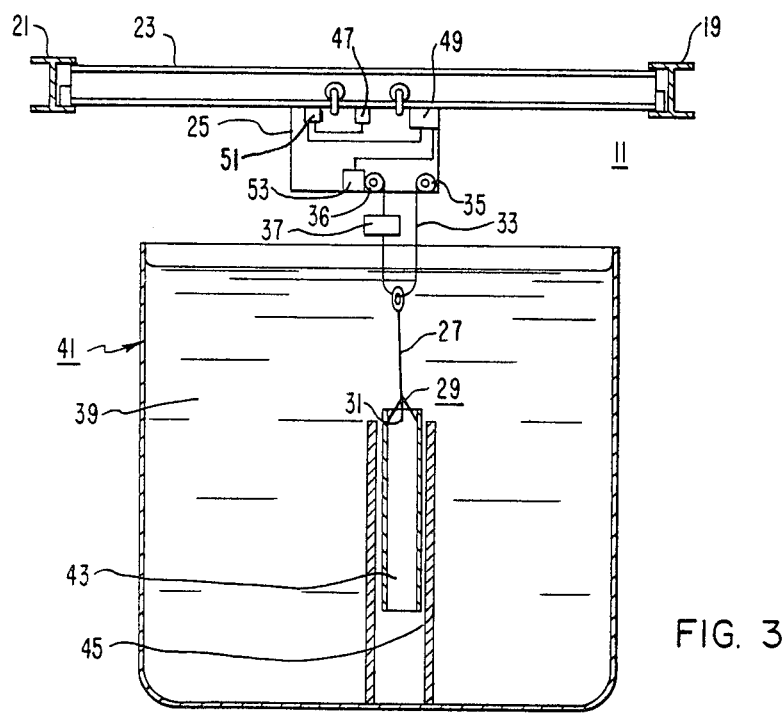
FIG. 3 is a diagrammatic fragmental view in side elevation, showing the relationship between the crane and a nuclear reactor during the raising of a fuel assembly.
Figure 5:
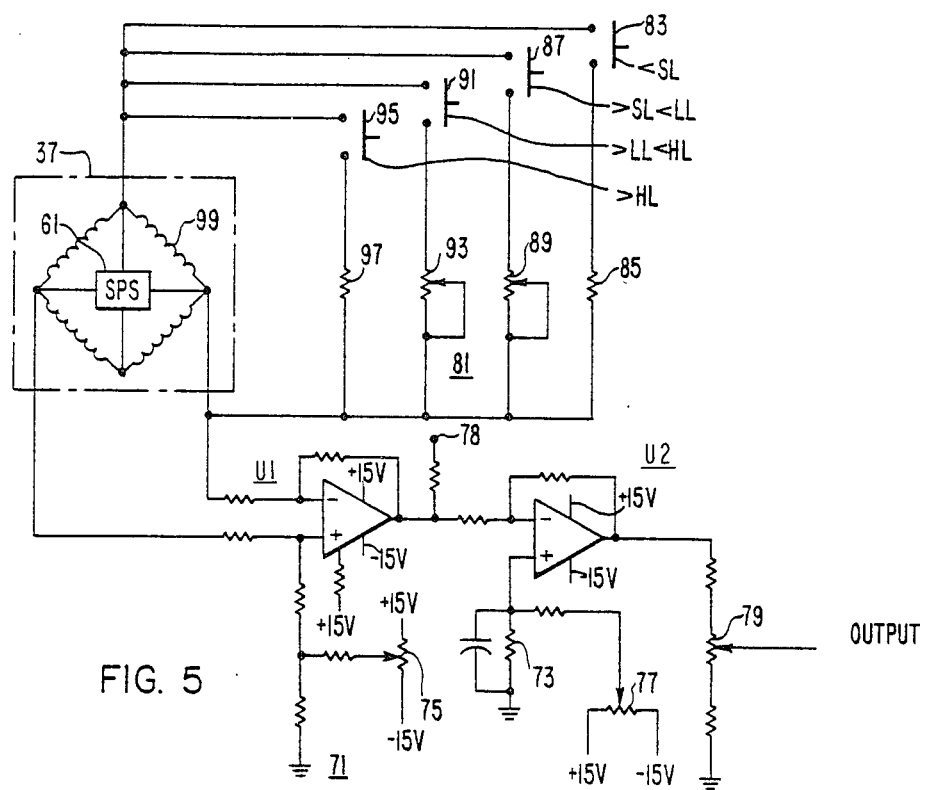
FIG. 5 is a schematic of component of the hoist-load monitor.

The crane 11 (FIGS. 2 and 3) is of conventional construction. It includes parallel rails 19 and 21 along which a cross rail 23 is movable. Along the cross rail a carriage 25 is movable. A crane line 27 is suspended from the carriage 25. The line terminates in a fixture 29 (FIG. 3), typically including expansible and collapsible fingers 31. The crane line 27 includes a chain or cable loop 33 which may be wound or unwound from pulley wheels 35 and 36 to raise or lower the fixture 29. In one branch of the cable 33, there is a load sensor 37. Typically the load sensor 37 is of the full-bridge, strain gauge type (FIG. 5). As shown in FIG. 3, the line 27 extends into the water 39 of a reactor 41 with its fingers 31 engaging a fuel assembly 43 disposed in a slot bounded by walls 45, which may be the walls of adjacent fuel assemblies. The carriage contains the line drive 47, the traverse drive 49 and the crane controller 51. The line drive 47 drives pulley wheels 35 and 36 to raise or lower the line 27. The traverse drive 49 drives the cross rail 23 along rails 19 and 20 and the carriage 25 along the cross rail 23. The crane controller 51 controls the operation of the drives 47 and 49 and of other components of the crane 11 such as indicators in the carriage 25. The carriage includes hydraulic means (not shown) which supplies fluid to open or close the fingers 31 of the fixture 29. The carriage 25 also contains a limit switch 53 which is in the energizing circuit of traverse drive 49. This switch is closed by the build-up of cable on pulley wheel 36 when the loop 33 is wound up and the crane line 27 is in the uppermost position. Once the line departs from the uppermost position, limit switch 53 is opened and the energizing circuit for traverse drive 49 through the switch is open.

The pendant 13 includes push-buttons (not shown) for operating the crane 11. Typically, there is a "START" button which starts operation of the crane, a "STOP" button which stops operation, a "RAISE" button which enables or energizes the line drive 47 to raise the line 27, a "LOWER" button to enable the line drive to lower the line, and a plurality of buttons to control the enabling and direction of the traverse drive 49. Where both the carriage 25 and the cross beam 23 are driven, the traverse drive 49 may include two motors, one to move the carriage 25 and the other to move the cross beam. Each of the latter motors is controlled by two pushbuttons on the pendant 13.

Figure 4:
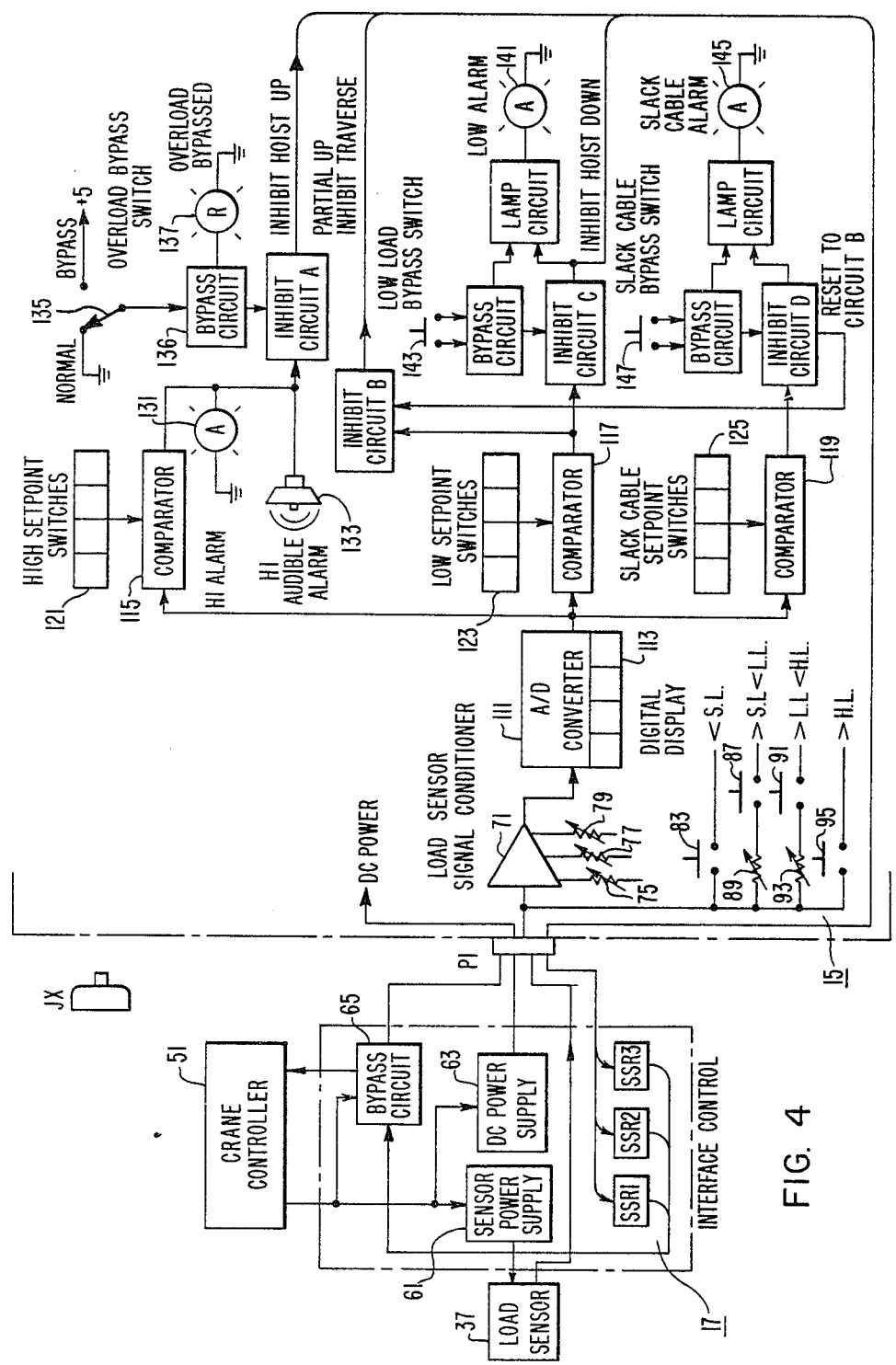
FIG. 4 is a block diagram showing the principal components of the hoist-load monitor and of the control interfaced between the monitor and the crane and the cooperative relationship between these components.

The interface control 17 (FIG. 4) includes the load-sensor power supply 61, the low-level DC power supply 63 for the monitor 15, relays SSR1, SSR2, SSR3, and a bypass circuit 65 for enabling the crane to operate without the monitor 15 typically, in the event that monitor 15 becomes defective. In this case, the crane can be operated in its normal manual mode. This is accomplished by disconnecting monitor 15 and inserting shorting connector JX (FIG. 4) into cable connector P1. The by-pass circuit 65 is then actuated and the crane can be operated manually. Three cables (not shown in detail) terminate in the interface control. One cable is the load-sensor cable. Another cable provides the interface connections to the crane controller 51. This cable includes eight conductors. Two conductors supply commercial (typically 120 V AC) power to the power supplies 61 and 63, four conductors serve for the "UP" and "DOWN" inhibit control of the crane line 27 (FIGS. 2, 3), two conductors control the inhibit of traverse drive when the line 27 is partially raised and is connected to a fuel assembly 43 (FIG. 3). The third cable interfaces the load monitor 15 as shown in FIG. 4.

The monitor 15 is of the low-level DC type. The relays SSR1, SSR2, SSR3 are of the solid-state optical type. Each relay includes a light emitting diode or transistor (not shown) which is dark or emits light depending on the signal to it from the sensor 15. In each relay a light-sensitive transistor or silicon-controlled rectifier (not shown) responsive to the light-emitting diode, performs the relaying function. The relays SSR1, SSR2, SSR3 are of the optical type to isolate the low-level control logic of the monitor 15 from the higher-level power in the interface control 17.

Figure 7:
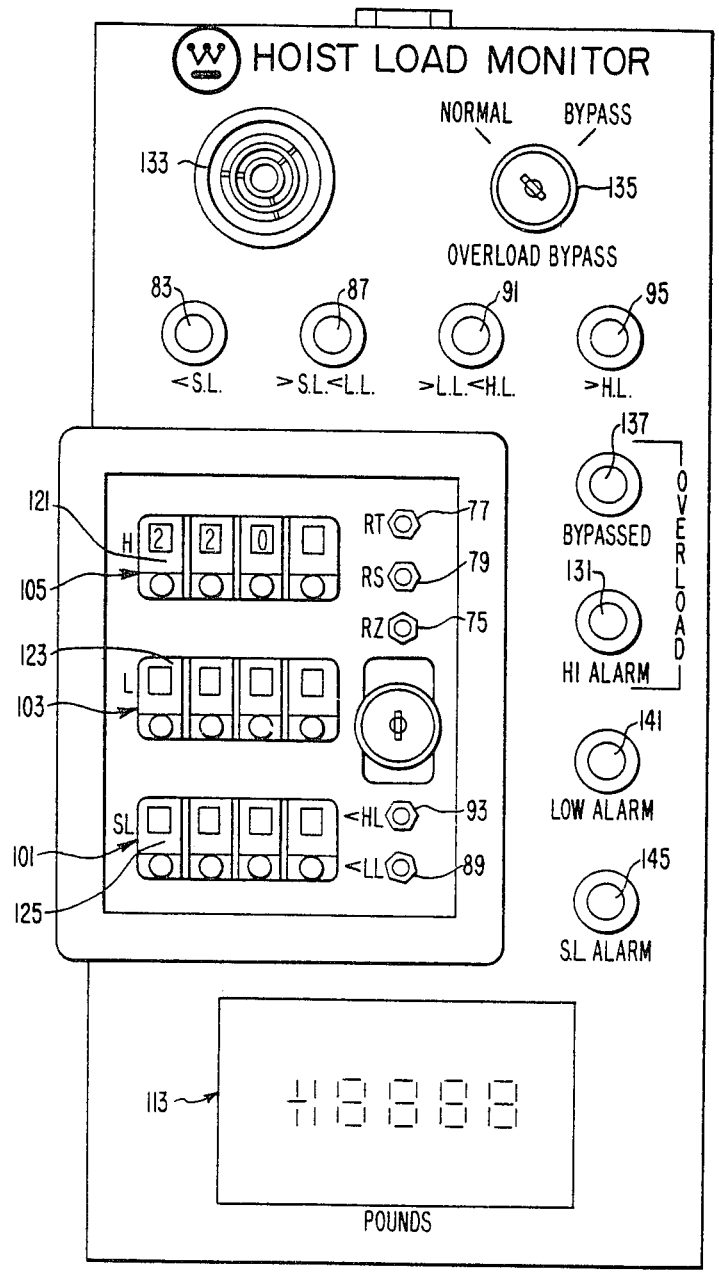
FIG. 7 is a view in front elevation of the control and indicator panel of the hoist-load monitor.

The monitor 15 includes a load-sensor signal conditioner 71. This signal conditioner is shown in detail in FIG. 5. It includes the cascaded operational amplifiers U1 and U2. The input to U1 is derived from the output of the load sensor 37 which is assumed to be a strain bridge. The output of U1 is impressed between the negative and positive inputs of U2 through resistor-capacitor filter network 73. This network serves to suppress high-frequency noise in the output of U1. A selectable bias is impressed on the positive terminal of U2 through the variable resistor 77 to eliminate the effects of any undesired weight on the line, for example weights on fixture 29 (FIG. 3). The range of the conditioned signal is set by span variable resistor 79 from which the output of U2 is derived. A readily accessible test point 78 is connected to the output of U1. The network 81 serves to test the response of the monitor 15 to the output of the load sensor. This network includes pushbutton 83 (FIG. 7) in series with resistor 85, pushbutton 87 in series with potentiometer 89, pushbutton 91 in series with potentiometer 93, and pushbutton 95 in series with resistor 97. Each of these buttons when closed operates to connect its resistor or potentiometer across a resistor 99 of the load sensor 37. With resistor 85 connected across resistor 99, the load sensor 37 is set for a magnitude less than slack-line setpoint. With potentiometer 89 connected across resistor 99, the load sensor is set for a magnitude greater than slack-line setpoint but less than low-load setpoint. With potentiometer 93 across resistor 99, the load sensor is set for a magnitude greater than low-load setpoint but less than high-load setpoint. With resistor 97 across resistor 99, the load sensor is set for a magnitude greater than high-load setpoint. The resistors 85 through 97 are so selected and the potentiometers are so set that on the closing of a pushbutton a predetermined selected magnitude is displayed on the associated indicator 113 (FIG. 7).

The output of the signal conditioner 71 is supplied to an analog-to-digital converter 111 (FIG. 4) which converts the analog signals from the load sensor 37 into digital signals. The output of the A/D 111 produces a display of the load on the crane line 27 on the indicator 113 (FIG. 7). The output of the A/D is also supplied to comparators 115, 117 and 119 in parallel. The comparators are digital. Each comparator includes buttons 121, 123, 125 (FIG. 7) for setting separately its digits. The HL setpoint is set on comparator 115, the LL setpoint on comparator 117, and the SL setpoint on comparator 119.

The numbers at the output of A/D 111 are compared with the numbers set on comparators 115-119 and appropriate signaling and processing based on the results of the comparison is produced. When the hoist load 43 on the crane line 27 is less than the HL setpoint, inhibit-circuit A, connected to the output of comparator 115, actuates relay SSR1 to the "ON" setting and the raising of the load proceeds normally. When the hoist load 43 is greater than the HL setpoint, the output of the high comparator 115 conducts and initiates three functions. First, the HIGH ALARM OVERLOAD indicator 131 illuminates; second, the audible alarm 133 sounds in a pulsing mode. Third, the output of the inhibit-circuit A turns off thus turning off SSR1 which inhibits the hoist from being raised. Typically, the output of SSR1 is in series with the crane line up controls of the crane 11. If the overload is removed, the HIGH ALARM 131 indicator goes out and the audible alarm 133 is silenced. If the system is in a high overload mode, the operator may elect to override this condition by placing the overload bypass switch 135 in the BYPASS mode. A key is required to operate the high bypass switch. This switch 135 enables bypass circuit 136 to override the blocking function which prevents operation of the crane 11 under overload. When this switch is in the BYPASS mode, the OVERLOAD BYPASSED indicator 137 is illuminated red and pulsates. The audible alarm and high-overload indicator 131 are also energized. In the OVERLOAD BYPASSED mode, SSR1 is again energized allowing the crane line 27 to be operated in the UP mode with an overload. Again, as described previously, when the overload is removed, the HI ALARM and audible alarm are turned off; however, the OVERLOAD BYPASSED indicator continues to pulsate to remind the operator that the key operated function is in the bypassed mode and should be returned to NORMAL. When this key operated switch is placed in NORMAL, the pulsating OVERLOAD BYPASSED indicator goes out. It is pointed out that no matter what the load or alarming condition, the digital display always displays the load in pounds or kilograms on indicator 113.

Under normal conditions when the load is less than the low-load setpoint, inhibit circuit B is in the ON condition which energizes SSR2 whose output is in series with the crane-control partial-up switch circuit. This circuit controls the crane traverse operation. When the hoist load exceeds the low-load setpoint setting, inhibit circuit B turns off, thus deenergizing SSR2 and therefore inhibiting crane traversing in the partial up mode. Once this circuit is inhibited, it remains in this mode until it is reset by the slack-cable setpoint signal. This reset action takes place when the hoist load is less than the slack-cable setpoint. This operating function cannot be bypassed.

When the hoist load is greater than the LL setpoint, inhibit-circuit C is ON and the crane line 27 can be lowered. During this operation, SSR3 is energized and its output is in series with the hoist-down controls. When the load is less than the LL setpoint, inhibit circuit C turns off thus deenergizing SSR3. At this time the hoist down circuit is inhibited and the LOW ALARM indicator 141 is illuminated. This indicator 141 is one of the only two units that are indicating pushbuttons. If the load later exceeds the LL setpoint the LOW ALARM indicator 141 goes out and the apparatus is in the initial operating condition. However, if the load is in the alarm condition (less than LL setpoint) and crane-line down inhibited, the operator may continue hoist down operations by depressing the LOW ALARM bypass pushbutton 143. This places the LOW ALARM in the BYPASS mode and causes the illuminated LOW ALARM indicator to pulsate. The operator may now continue hoist lowering conditions.

Continuing with the above-described operation with the LOW ALARM pulsating (low-load alarm bypassed), the operator may continue to lower the crane line 27. When the hoist load is less than the SL setpoint, the slack cable ALARM indicator 145 illuminates, the pulsating LOW ALARM indicator goes out and the hoist lowering circuit is again inhibited from lowering. The operator may now depress the slack cable indicator alarm pushbutton 147 which places the slack cable inhibit circuit D in the bypass mode and causes the slack cable ALARM indicator to pulsate. In addition, the crane line can be lowered again. Switches 145 and 147 are indicating pushbuttons.

With the loading on the crane line 27 less than the SL setpoint inhibit circuit D is enabled to reset inhibit-circuit B so that the traverse drive 49 is enabled. When the loading now becomes greater than the SL setpoint but less than the LL setpoint, inhibit circuit D is reset but inhibit circuit B remains in the ON condition. Relay SSR2 remains ON and the traverse drive 49 remains enabled. The SL ALARM 145 goes out and the LL ALARM 141 is illuminated. If the loading exceeds LL setpoint inhibit circuit B and relay SSR2 are set in OFF and LOW ALARM 141 is turned off. Traverse drive 49 is disabled.

Figure 6A:
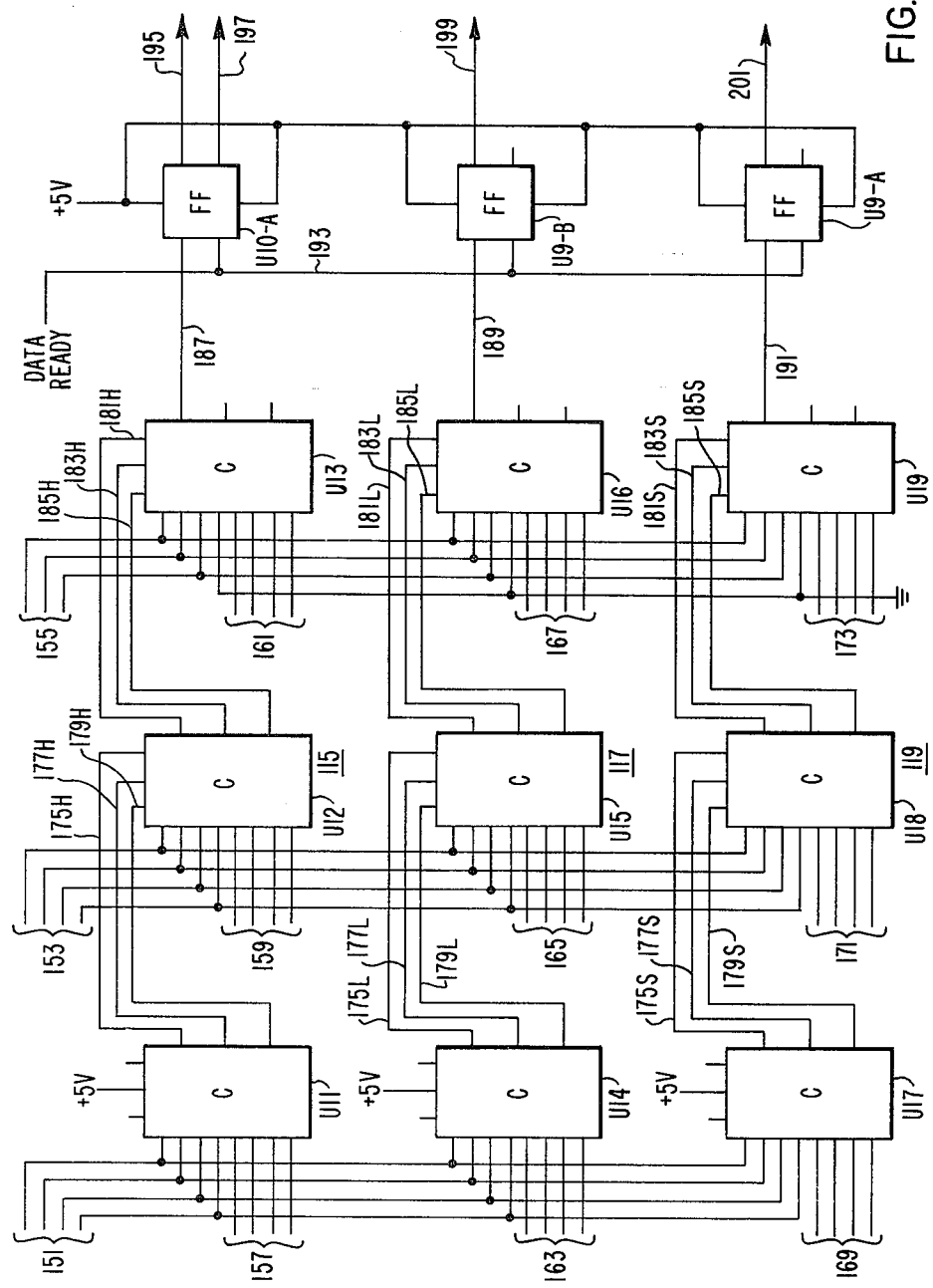
FIGS. 6A and 6B together constitute a digital logic and control schematic of the facility according to the invention for comparing the measures of the load sensor and the respective setpoints, for processing this data, and for controlling the crane in accordance with this processing.
Figure 6B:
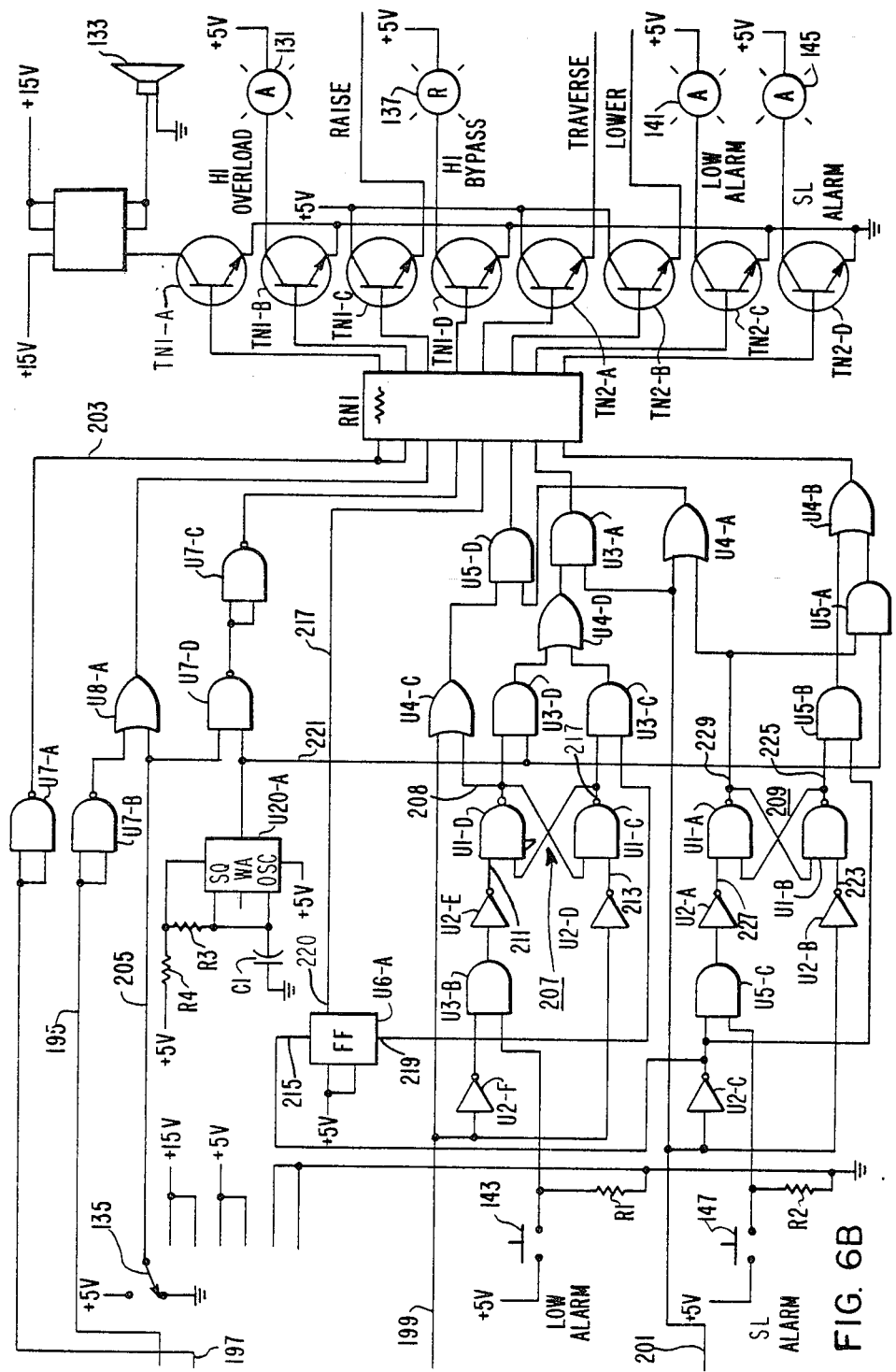

For further elaboration of the invention, the reader is referred to FIGS. 6A and 6B. The comparator 115 (FIG. 6A) includes units U11, U12 and U13. Unit U11 compares the least significant digits of the HL setpoint with the least significant digits of the signal from the load sensor 11. Unit U12 compares the digits of intermediate significance of the HL setpoint and of the signal from the load sensor 37. U13 compares the most significant digit of the HL setpoint and the signal from the load sensors. The corresponding digits are presented in FIG. 7 as 2 2 0. The evaluation of the loading is to ±10 pounds and for this reason the fourth digit is not set. Likewise the LL setpoint and the corresponding signal from the load sensor are compared in units U14, U15, U16 and the SL setpoint and the corresponding signal from the load sensor in units U17, U18, U19.

In describing the operation of the comparator (FIG. 6A) and the logic associated with it (FIG. 6B) the signals will be identified as 1's or 0's, a signal of 2.4 volts or higher being identified as a 1 and a signal of 0.4 volts or lower being identified as a 0. The A/D 111 includes a digital meter (113) whose digital output corresponds to the response of the load sensor 37. The signals derived from the A/D 111 are entered as 1's or 0's on the upper four inputs of each unit U11 through U18, through sets of conductors 151, 153, 155. The setpoints are set on the lower four inputs of each unit U11 through U19, through sets of conductors 157 through 173. Conductors 175H, 177H and 179H transmit intelligence as to the result of the comparison from unit U11 to unit U12. A 1 entered on conductor 175H and 0's on 177H and 179H signals that the least significant digit of the HL setpoint is exceeded by the least significant digit of the load-sensor signal; a 1 entered on conductor 177H and 0's in 175H and 179H signals that the least significant digit of the HL setpoint exceeds the least significant digit of the load sensor signal; a 1 entered on conductor 179H and 0's on 175H and 177H signals that the least significant digits of the HL setpoint and load sensor signals are equal. Conductors 181H, 183H and 185H perform the same function in the comparison of the digits of intermediate significance of the HL setpoint and of the load sensor signal. Corresponding functions are performed by conductors 175L through 185L of the low level comparator 117 and by the conductors 175S through 185S of the slack line comparator 119.

The output conductors 187, 189, 191 of the most significant digit units U13, U16 and U19 are each connected to a flip-flop U10-A, U9-B and U9-A, respectively. A 1 on conductor 187 signals that the HL setpoint is exceeded, a 1 on conductor 189 that the LL setpoint is exceeded, and a 1 on conductor 191 that the SL setpoint is exceeded. The flip-flops U10-A, U9-B and U9-A are conditioned to respond by the leading edge of 1 on data-ready conductor 193 which is connected to the conditioning inputs of the flip-flops. The data ready conductor 193 receives its intelligence from A/D 111. A 0 on input conductor 187 of flip-flop U10-A produces a 0 on its upper output conductor 195 and a 1 on its lower output conductor 197. A 1 on 187 produces a 1 on conductor 195 and 0 on 197. A 0 on input conductor 189 of flip-flop U9-b produces a 0 on its output conductor 199 and a 1 on 189 produces a 1 on 199. A 0 on input conductor 191 of flip-flop U9-A produces a 0 on its output 201 and a 1 on 191 produces a 1 on 201.

Summarizing, for HL exceeded there is a 1 on conductor 195 and a 0 on 197. For HL not exceeded there is a 0 on 195 and a 1 on 197. For LL exceeded there is a 1 on 199 and for LL not exceeded there is a 0 on 199. For SL exceeded there is a 1 on 201, for SL not exceeded there is a 0 on 201.

The operation of the logic shown in FIG. 6B will now be described. First consider normal operation. The load on line 27 is greater than LL setpoint and less than HL setpoint. There is a 0 on conductor 195 and 1's on conductors 197, 199 and 201. There is a 0 on the base of transistor TN1-A through NAND U7-A, conductor 203 and resistor bank RN-1. TN1-A is non-conducting and sound alarm 133 is disabled. There is also a 0 on transistor TN1-B. TN1-B is non-conducting and HI OVERLOAD light 131 is extinguished. Switch 135 is not closed but there is a 1 on the base of transistor TN1-C from line 195 through NAND U7-B, or U8-A, bank RN-1. TN1-C is energized. This transistor is connected to actuate relay SSR1 to ON when energized. The line drive 47 is enabled to raise the load 43. Since the bypass switch 135 is open, there is a 0 on conductor 205. The flow of square-wave pulses from oscillator U20-A to the base of transistor TN1-D through NAND U7-D, NAND U7-C and bank RN1 is blocked by NAND U7-D and bypass light 137 is dark. There is a 1 on conductor 201. There is a 0 on the base of transistor TN2-A from conductor 201 through inverter U2-C, flip-flop U6-A and bank RN1. Transistor TN2-A is deenergized. TN2-A is connected to actuate relay SSR2 to ON when energized. SSR2 is OFF and the traverse drive 49 is disabled. Since there are 1's on conductors 199 and 201, there are 1's on inputs of AND U5-D through OR's U4-C and U4-A. There is a 1 on the base of transistor TN2-B. TN2-B is energized. TN2-B is connected to actuate relay SSR3 to ON when energized. Line drive 47 is enabled to lower the load 43 as necessary. With a 1 on 199 there is a 0 on the upper input of AND U3-C and 0 on the lower input of OR U4-D. There is also a 0 on the upper input of this OR U4-D from 199, through inverter U2-F, AND U3-B, inverter U2-E, flip-flop 207, formed of NAND's U1-C and U1-D, and AND U3-D. The triggering input of this flip-flop 207 is the lower input of U1-C. A 0 on this input produces a 0 at the output 208 and a 1 at the input produces a 1 at the output 208 when there is a 1 on input 211. There is a 0 in the base of transistor TN2-C from U4-D through AND U3-A and bank RN-1. The LOW ALARM 141 is dark. With a 1 on conductor 201 there is a 0 on the upper input of OR U4-B from 201 through inverter U2-C, and AND U5-B. There is also a 0 on the lower input of OR U4-B from 201, through inverter U2-C, AND U5-C, inverter U2-A, flip-flop 209 formed of NAND's U1-A and U1-B, and AND U6-A. The triggering input of the flip-flop 209 is the lower input of U1-B. There is a 0 on the base of transistor TN2-D from OR U4-B, through RN-1. The SL ALARM 145 is dark.

On the occurrence of an overload there is a 1 on conductor 195 and a 0 on 197. With switch 135 open, there are 0's on the inputs to OR U8-A. There is a 0 on the base of TN1-C and TN1-C is deenergized and the line drive 47 is prevented from raising the line. There are also 1's on the bases of transistors TN1-A and TN1-B and the audible alarm 133 is enabled and the HL OVERLOAD signal 131 is lighted. If the setting of the HL setpoint is raised so that the overload becomes less than the HL setpoint, the apparatus is reset to normal load as described above.

With the bypass switch 135 closed on overload, there is a 1 on conductor 205. U7-D is unblocked and square wave pulses alternating between 1 and 0 are impressed on the base of TN1-D and on the BYPASSED light 137 and this light flashes on and off.

During lowering when the load 43 encounters an obstruction but the line 27 is not slack, the signal sensed by the load sensor 37 is less than LL setpoint but greater than SL setpoint. The only change from normal is a 0 on conductor 199. There is a 0 on the upper input of OR U4-C from 199. There is a 1 on input 213 of flip-flop 207 and a 0 on its output 208. There is a 0 on the lower input of OR U4-C. There is a 0 on the base of transistor TN2-B and relay SSR3 and the line drive 49 is disabled from lowering the load. Since a 1 remains on conductor 201, transistor TN2-A remains deenergized and traverse drive 49 is disabled. With a 1 on input 213 there is a 1 on output 217 of flip-flop 207 and on the upper input of AND U3-C. With a 0 on input 215 of flip-flop U6-A, from 201 through U2-C, there is a 1 on its output 219 and on the lower input of AND U3-C. There is a 1 on the upper input of AND U3-A through OR U4-D. There is also a 1 on the lower input of this AND from conductor 201. There is a 1 on the base of transistor TN2-C and the transistor is energized and LOW ALARM 141 is lighted. When the LOW ALARM pushbutton 143 is depressed, there is a 0 on input 211 of flip-flop 207 through AND U3-B and inverter U2-E. There is a 1 on its output 208 and on the upper input of AND U3-D. LOW ALARM light 141 is pulsed from oscillator U20-A through conductor 221, AND U3-D, OR U4-D, AND U3-A, RN-1, and base of transistor TN2-C. With LOW ALARM pushbutton 143 depressed, there is a 1 on output 208 of flip-flop 207 and a 1 on the upper input of AND U5-D through OR U4-C. There is also a 1 on the lower input of U5-D through OR U4-A. There is a 1 on the base of transistor TN2-B and the crane line 27 is lowered to slack line. Once the line 27 is in slack line setting the LOW ALARM pushbutton may be released.

With the load-sensor signal less than SL setpoint, there are 0's on conductors 199 and 201. There is a 1 on input 223 of flip-flop 209 from 201 through inverter U2-B. There is a 1 on its output 225 and on the upper input of AND U5-B. There is also a 1 on the lower input of this AND from conductor 201 through inverter U2-C. There is a 1 on the base of transistor TN2-D and the SL ALARM 145 is lighted. There is a 0 on base TN2-C from 201 through AND U3-A and RN-1 and LOW ALARM 141 is disabled. There is a 0 on the upper terminal of OR U4-A. There is a 1 on input 223 of flip-flop 209 and a 1 on input 227 through AND U5-C and inverter U2-A. There is a 0 on its output 229 and on the lower input of OR U4-A. There is a 0 on the base of transistor TN2-B and the line drive 47 is disabled from lowering the crane line 27. There is a 1 on input 215 of flip-flop U6-A. There is a 0 on the base of transistor TN2-A and the traverse drive 49 is disabled. There is a 1 on the base of transistor TN1-C from conductor 195, through NAND U7-B, OR U8-A, and RN-1. The apparatus can raise crane line 27.

With SL ALARM pushbutton 147 closed, there is a 1 on both inputs of AND U5-C since there is a 0 on 201. There is a 0 on input 227 of flip-flop 209 and 1 on its output 229. There is a 1 on the upper input of AND U6-A and the SL ALARM 145 is pulsed by oscillations from U20-A through AND U6-A, OR U4-B, RN-1 to the base of transistor TN2-D. With a 1 on the output 229 of flip-flop 209 there is a 1 on the lower input of AND U5-D through U4-A. There are 1's on inputs 211 and 213 of flip-flop 207 and a 1 on its output 208 and on the lower input of OR U4-C. There is a 1 on the upper input of AND U5-D and on the base of transistor TN2-B enabling the line drive 43 to lower the line 27 further. The SL ALARM button 147 is released after the crane line 27 is in the desired position and the apparatus reverts to the above-described setting with only the raise function enabled and the SL ALARM 145 lighted. Now the load 43 may be disconnected from the crane line 43 and the line may be raised. If the disconnection from the load is not successful, the apparatus reverts to normal. If the disconnection is successful, the load-sensor 37 senses only the weight of the line and fixture 29 and the load-sensor signal is greater than SL setpoint and less than LL setpoint. There are 0's on conductors 195 and 199 and 1's on conductors 197 and 201. The SL ALARM 145 is dark. There is a 0 on input 215 of flip-flop U6-A and a 1 on its output 220. There is a 1 on conductor 217 and on the base of transistor TN2-A. The traverse drive 49 is enabled and the line 27 terminating only in fixture 29 may be traversed to another load. There is also a 1 on the base of transistor TN1-C from conductor 195 through NAND U7-B enabling the raise function of the line drive 47. With a 1 on 201 there is a 1 on the lower input of AND U5-D. There is also a 1 on the upper input of AND U5-D because there are 1's on inputs 211 and 213 of flip-flop 207 and 1 on its output 208 and on the lower input of OR U4-C. TN2-B is conducting and the lower function of the line drive is enabled. There is a 1 on the upper input of AND U3-D. This AND passes pulses to the base of transistor TN2-C through OR U4-D AND U3-A and RN-1. LOW ALARM light 141 pulses.

Apparatus according to this invention has a number of advantages. The control panel and the electronics may be small and occupy a minimum of space. Since all circuits except for the signal corditioner 71 are digital, trouble-shooting of the apparatus is facilitated. The apparatus lends itself to the inclusion of a self-testing and calibrating circuit in such a way as to assure that all interlock and safety circuits function properly prior to loading of a crane 11. The feature may be entirely self-contained and requires no signal input from an external source. No AC power is used within the hoist-load monitor 15. The apparatus has a wide range and is capable of monitoring loads up to 19999 pounds. The apparatus can be scaled to function with any strain-gauge bridge-type transducer 37. It could use the setpoints to evaluate other parameters than tension such as pressure, torque or force.

While preferred practice of this invention has been disclosed herein, many modifications thereof are feasible. This invention is not to be restricted except insofar as is necessitated by the spirit of the prior art.

We claim:

1. Apparatus for removing and/or positioning fuel assemblies of a nuclear reactor during fueling, refueling or the like, the said apparatus including a crane, the said crane having:

(a) a line terminating in a fixture to be engaged with a fuel assembly to be removed and to be disengaged from a fuel assembly positioned by said crane,
(b) a line drive, connected to said line, to drive said line, and
(c) a traverse drive for said crane, load-sensing means, connected to said line, for sensing a load on said line, setpoint means for setting a high-level load setpoint, a low-level load setpoint and a slack-line setpoint, said high-level setpoint setting an upper limit on the loading of said crane when said line is raising a fuel assembly, said low-level setpoint setting a lower limit on the loading of said crane when said line is lowering a fuel assembly, said slack-line setpoint setting a limit dependent on the loading of said crane by said fixture and line alone, means, connected to said traverse drive, disabling said traverse drive when the line is in a position below its uppermost starting position, means, connected to said setpoint means, and responsive to said load-sensing means, for disabling said line drive when the load on said crane exceeds said high-level setpoint, means, connected to said setpoint means and responsive to said load-sensing means, for disabling said line drive when the load on the crane is less than said low-level setpoint, manual means, connected to said line-drive-disabling means, while the load on the crane is less than the low-level setpoint, for enabling said line-drive to raise said line and fixture, and means, connected to said setpoint means and responsive to said load-sensing means, when the load on the crane is below said slack-line setpoint, for enabling said traverse drive notwithstanding that said line is in a position below its uppermost starting position.

2. Apparatus for removing and/or positioning fuel assemblies of a nuclear reactor during fueling, refueling or the like, the said apparatus including a crane, the said crane having:
(a) a line termininating in a fixture to be engaged with a fuel assembly to be removed and to be disengaged from a fuel assembly positioned by said crane,
(b) a line drive connected to said line to drive said line, and
(c) a traverse drive for said crane, load-sensing means, connected to said line, for sensing the load on said line, setpoint means for setting a high-level load setpoint, a low-level load setpoint, and a slack-line setpoint, said high-level setpoint setting an upper limit on the loading of said crane when said line is raising a fuel assembly, said low-level setpoint setting a lower limit on the loading of said crane when said line is lowering a fuel assembly, said slack-line setpoint setting a limit dependent on the loading of said crane by said line and fixture alone, means, connected to said setpoint means and responsive to said load-sensing means, for disabling said line drive when the load on the crane exceeds said high-level setpoint, means, connected to said setpoint means and responsive to said load sensing means for disabling said line drive when the load on said crane is less than the low-level setpoint, means connected to said setpoint means and responsive to said load-sensing means, for disabling said traverse drive when the load on said crane exceeds said low-level setpoint, said traverse-drive disabling means including means for locking said traverse drive in the disabled condition, once the load exceeds the low-level setpoint, so that said traverse drive is not enabled if subsequent to such disablement of the traverse drive the loading on said crane is decreased to a magnitude between the low-level setpoint and the slack-line setpoint, and means, connected to said setpoint means and responsive to said load-sensing means, for disabling said traverse-drive locking means thereby enabling said traverse drive when the loading on said crane is less than the slack-line setpoint.

3. The apparatus of claim 2 wherein analog-to-digital converting means is interposed between the load-sensing means, the several line-drive disabling means and the traverse drive disabling and enabling means, so that the respective loadings of the crane is entered as digital magnitudes, and wherein the high level, low-level, and slack-line setpoints are entered as digital magnitudes, the said apparatus also including digital comparators for comparing the digital magnitudes of the respective loadings with the digital magnitude of the respective setpoints.

4. The apparatus of claim 3 including digital means for displaying the loading on the crane as a digital magnitude.

5. The apparatus of claim 3 including means for changing, each separately digit by digit, the most significant digit, the least significant digit and digits of intermediate significance each of the high-level, low-level and slack-line setpoints.

6. Apparatus for removing and/or positioning fuel assemblies of a nuclear reactor during fueling, refueling or the like, the said apparatus including a crane, the said crane having a line terminating in a fixture to be engaged with a fuel assembly to be removed and to be disengaged from a fuel assembly positioned by said crane, a line drive, connected to said line, to drive said line, load-sensing means, connected to said line, for sensing a load on said line, setpoint means for setting a high-level load setpoint and a low-level load setpoint, said high-level setpoint setting an upper limit on the loading of said crane when said line is raising a fuel assembly, said low-level setpoint setting a lower limit on the loading of said crane when said line is lowering a fuel assembly, first means, connected to said line drive and responsive to said load-sensing means, and a said setpoint means for disabling said line drive from raising said fuel assembly when the load on said crane exceeds said high-level setpoint, second means, connected to said line drive and responsive to said load-sensing means, and to said setpoint means, for disabling said line drive when the load on said line is less than the low-level setpoint, bypass means, connected to said first means, for overriding said high-level setpoint and enabling said line drive to raise said fuel assembly notwithstanding that said high-level setpoint is exceeded, said bypass means being operable by a key which cannot be removed from the key slot unless said key is turned to the non-bypassing setting, and signaling means for signaling that said first means is bypassed.

* * * * *